(12) United States Patent
Yamamoto (10) Patent No.: US 6,853,460 B1
(45) Date of Patent: Feb. 8, 2005

(54) IMAGE READING DEVICE (75) Inventor: Yasuhiro Yamamoto, Tokyo (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 09/200,853

(22) Filed: Nov. 30, 1998

(30) Foreign Application Priority Data

Dec. 1, 1997 (JP) .......................................... P09-345865

(51) Int. Cl.[7] .............................................. G06F 15/00
(52) U.S. Cl. ..................................... 358/1.15; 358/296
(58) Field of Search ............................... 358/1.13, 1.14, 358/1.15, 296, 401, 448, 483, 404, 437, 444, 518

(56) References Cited

U.S. PATENT DOCUMENTS

| 4,656,525 A | * | 4/1987 | Norris ........................ 358/401 |
| 4,953,230 A | * | 8/1990 | Kurose ....................... 358/464 |
| 5,315,403 A | * | 5/1994 | Hirai et al. ................. 358/404 |
| 5,390,003 A | * | 2/1995 | Yamaguchi et al. ........ 399/366 |
| 5,473,370 A | * | 12/1995 | Moronaga et al. ......... 348/207 |
| 5,656,802 A | | 8/1997 | Aoki |
| 5,675,422 A | * | 10/1997 | Hara et al. .................. 358/404 |
| 5,677,775 A | * | 10/1997 | Yamaguchi et al. ........ 358/468 |
| 5,745,220 A | * | 4/1998 | Okazaki et al. ............ 358/1.13 |
| 5,854,693 A | * | 12/1998 | Yoshiura et al. ............ 358/1.1 |
| 5,898,824 A | * | 4/1999 | Kato et al. .................. 358/1.16 |
| 5,930,003 A | * | 7/1999 | Kondo ........................ 358/404 |
| 6,067,168 A | * | 5/2000 | Nishiyama et al. ......... 358/1.16 |
| 6,144,459 A | * | 11/2000 | Satou ......................... 358/1.15 |
| 6,219,152 B1 | * | 4/2001 | Someya et al. ............ 358/1.16 |
| 6,222,637 B1 | * | 4/2001 | Ito et al. .................... 358/1.18 |
| 6,347,162 B1 | * | 2/2002 | Suzuki ....................... 358/296 |
| 6,587,220 B1 | * | 7/2003 | Sato et al. .................. 358/1.16 |
| 6,603,579 B1 | * | 8/2003 | Kuwahara .................. 358/468 |
| 6,606,161 B2 | * | 8/2003 | Murata ....................... 358/1.15 |

FOREIGN PATENT DOCUMENTS

JP 0724189 A1 * 1/1996 ............ G03B/27/62

* cited by examiner

Primary Examiner—Mark Wallerson
(74) Attorney, Agent, or Firm—Greenblum & Bernstein, P.L.C.

(57) ABSTRACT

The image reading device has an input/output terminal on a housing. A computer is connected to the input/output terminal. An image recorded in a film is read by a line sensor. Image data obtained by the reading operation can be recorded in a recording medium, which is mounted in the housing, and can be transferred to the computer. When the recording operation, in which the image data is recorded in the recording medium, can not be performed, the recording operation is prohibited, and a transfer operation, in which the image data is transferred to the computer is allowed. Further, an indication, implying that the image data will be transferred to the computer, is shown by a display panel so that a mishandling is prevented.

11 Claims, 9 Drawing Sheets

IMAGE READING DEVICE

BACKGROUND OF THE INVENTION

1. Field of the Invention

The present invention relates to an image reading device in which an image, recorded in a film, for example, is read by a line sensor.

2. Description of the Related Art

Conventionally, such an image reading device can be controlled by a host computer provided externally to the image reading device. Namely, a reading operation, in which an image is read by a line sensor, and a recording operation, in which image data obtained by the reading operation is recorded in a recording medium mounted in the image reading device, can be controlled by the host computer. On the other hand, in a stand-alone mode of the image reading device, i.e. independently from the host computer, the image data can be recorded in the recording medium by operating a switch provided on the image reading device.

When the recording medium does not have a sufficient remaining volume to record image data, even if an operator tries to record the image data in the recording medium by operating the switch, the recording operation would not be carried out due to an operation of a control circuit provided in the image reading device. In such a case, by increasing the compression ratio of the recorded image data or the thinning rate of the image data, the image data may become recordable to the recording medium. Nevertheless, if the image data need be recorded without changing the compression ratio or the thinning rate, the image data should be transmitted to a computer and recorded in the other recording medium set in the computer. These operations are complicated, and therefore it is difficult to perform the error-free operations.

SUMMARY OF THE INVENTION

Therefore, an object of the present invention is to provide an image reading device which can record image data in a recording medium without a mishandling occurring.

According to the present invention, there is provided an image reading device comprising a housing, a reading processor, an image data transmitting processor an image data recording processor, a recording operation determination processor and a control processor.

The reading processor optically reads an image recorded on a recording material sheet to generate image data. The image data transmitting processor can transmit the image data externally to a peripheral device. The image data recording processor can record the image data in a recording medium mounted in the housing. The recording operation determination processor determines, based on a state of the recording medium, whether a recording operation of the image data recording processor is possible. The control processor that, when the recording operation determination processor determines that the recording operation is impossible, prohibits the recording operation and allows the image data transmitting processor to transmit the image data to the peripheral device.

Further, according to the present invention, there is provided an image reading device comprising an optically reading processor, a transmitting processor, a recording processor, a determining processor and a control processor.

The optically reading processor optically reads an image recorded on a recording material sheet to generate image data. The transmitting processor transmits the image data to an computer provided outside of the image reading device. The recording processor records the image data in a recording medium mounted in the image reading device. The determining processor determines, based on a state of the recording medium, whether a recording operation of the image data recording processor can be performed. The control processor controls the transmitting means and the recording means, the control means prohibiting the recording operation and allowing the image data transmitting processor to transmit the image data to the computer, when the determining processor determines that the recording operation is impossible.

BRIEF DESCRIPTION OF TEE DRAWINGS

The present invention will be better understood from the description of the preferred embodiments of the invention set forth below, together with the accompanying drawings, in which.

DESCRIPTION OF THE PREFERRED EMBODIMENTS

The present invention will be described below with reference to embodiments shown in the drawings.

Figure 1:
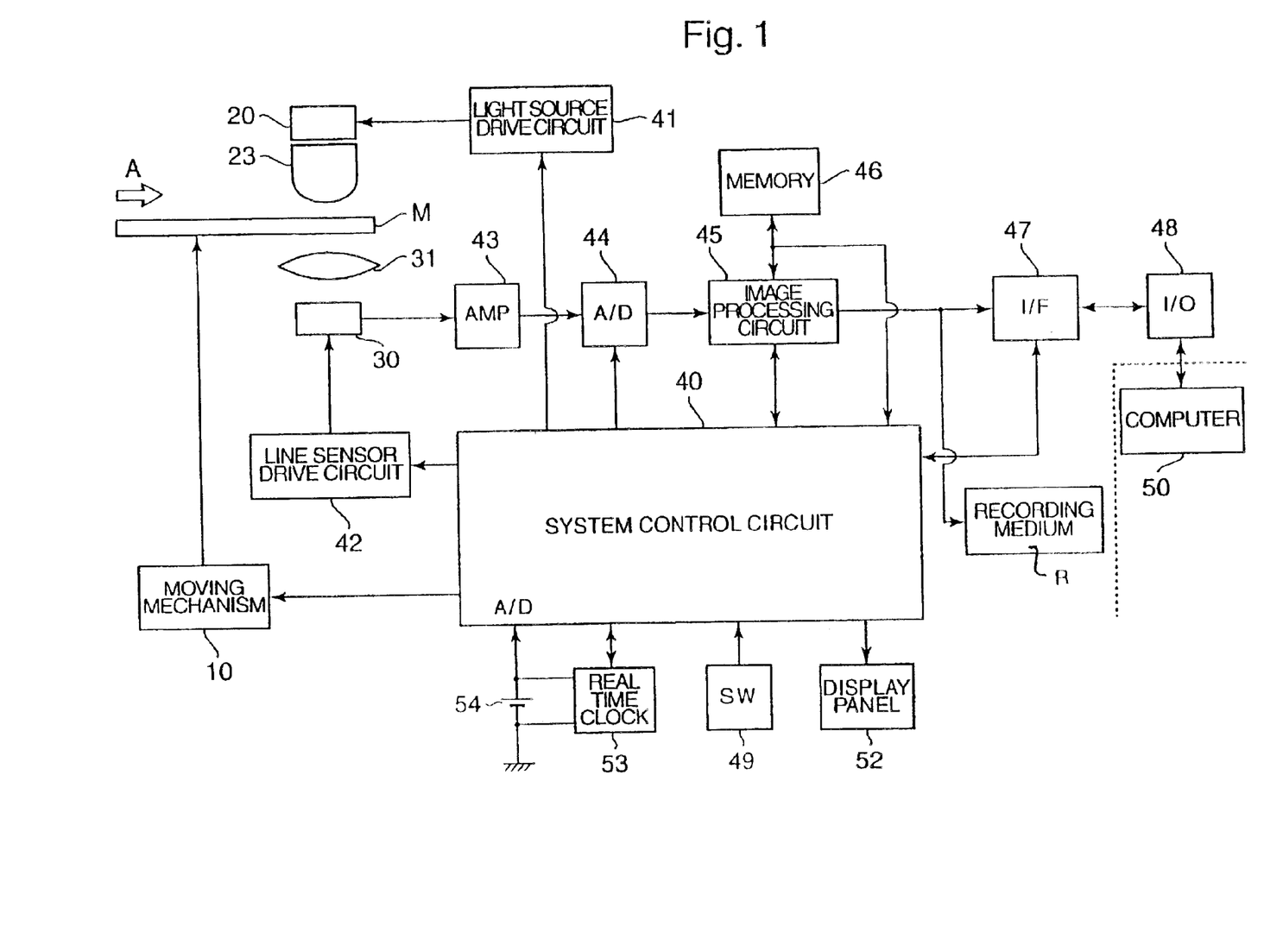
FIG. 1 is a block diagram showing an image reading device of an embodiment of the present invention.

FIG. 1 shows an electrical structure of an image reading device of an embodiment of the present invention.

A read object M (i.e. a sheet of recording material), handled by this image reading device, is a transparent negative film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photodiodes, which are aligned rectilinearly, whereby an electric signal, corresponding to the amount of light received by the photo-diode, is generated in each of the photo-diodes. The electric signal (i.e. the image data), read through the line sensor 30, is amplified by an amplifier 43 and is converted to a digital signal by an A/D converter 44. The digital image data are subjected to an image process, such as a shading correction, in an image processing circuit 45, and are then stored in a memory 46.

The digital image data, subsequent to being read from the memory 46, are subjected to various correction processes, such as a color correction and a gamma correction. The corrected digital image data can be recorded in a recording medium R. Further, the corrected digital image data are converted to a signal, which conforms to a predetermined format, by an interface circuit 47, and are outputted through an input/output terminal 48 to a peripheral device, i.e. external computer 50, which is provided externally to the image reading device.

Thus, the image reading device and the peripheral or external computer 50 can communicate with each other through the interface circuit 47 and the input/output terminal 48, so that various control operations can be performed by the image reading device and the external computer 50. The A/D converter 44, the image processing circuit 45, the interface circuit 47, and a recording operation of the recording medium R are controlled by the system control circuit 40.

In this embodiment, although all of the operations of the image reading device can be performed in a remote mode in which the image reading device is controlled by the computer 50, the operation can also be performed in a stand-alone mode in which the image reading device is controlled by operating an operation switch 49 connected to the system control circuit 40.

Additionally, a display panel 52 and a real time clock 53 are connected to the system control circuit 40. The display panel 52 is provided for indicating various kinds of conditions regarding operations of the image reading device, such as an indication implying that the image reading device can be operated in the remote mode. The real time clock 53 is provided for recording a date and a time in the recording medium R. Note that a back-up battery 54 is connected to the real time clock 53.

Figure 2:
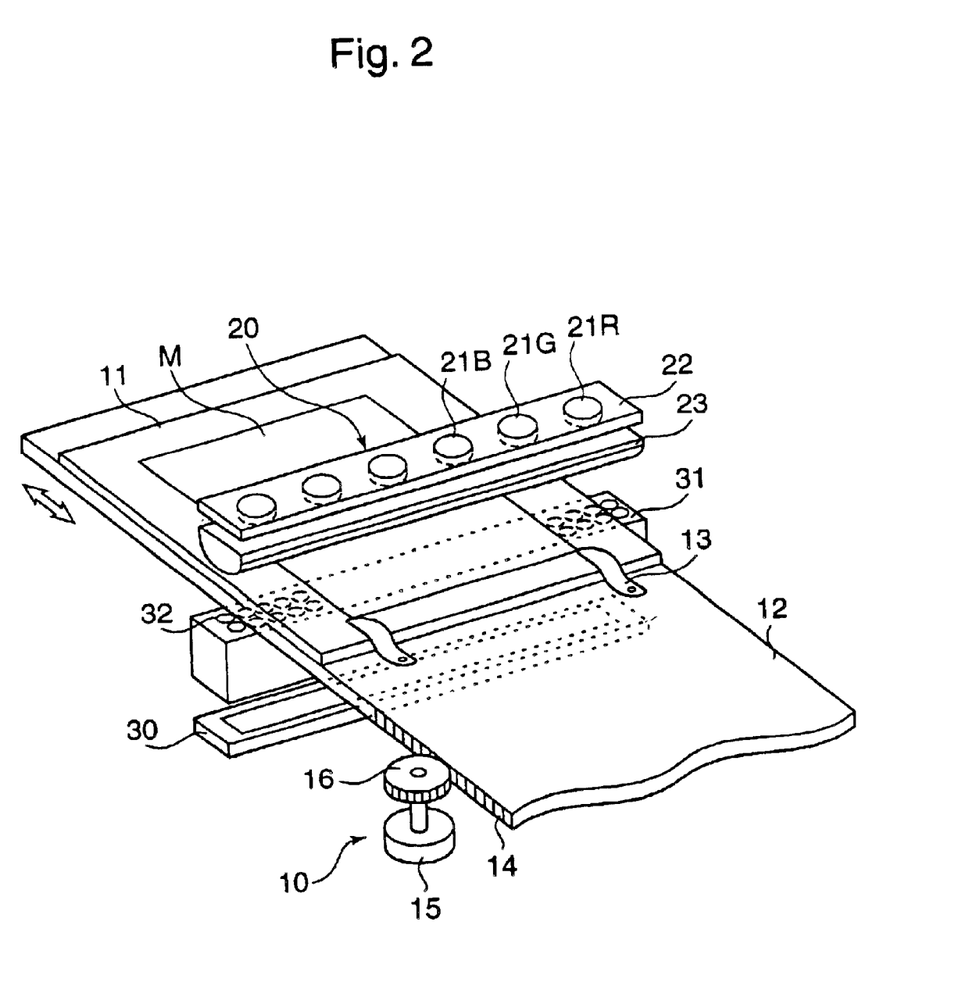
FIG. 2 is a perspective view showing a moving mechanism, a light source and a line sensor, when a transparent film is used.

FIG. 2 shows the moving mechanism 10, the light source 20 and the line sensor 30. The film M is supported by a frame 11, which is fixed on a plate stage 12 by a fastener 13. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position of the film M is controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. This order can be changed in accordance with necessity.

The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the film M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the film M is moved. The forming lens 31 is provided between the line sensor 30 and the stage 12. The forming lens 31, composed of a rod lens array 32, extends parallel to the line sensor 30. Accordingly, when a light beam is emitted onto the film M, by the light source 20, the image recorded in the film M is formed on the light receiving surface of the line sensor 30, through the forming lens 31.

Figure 3:
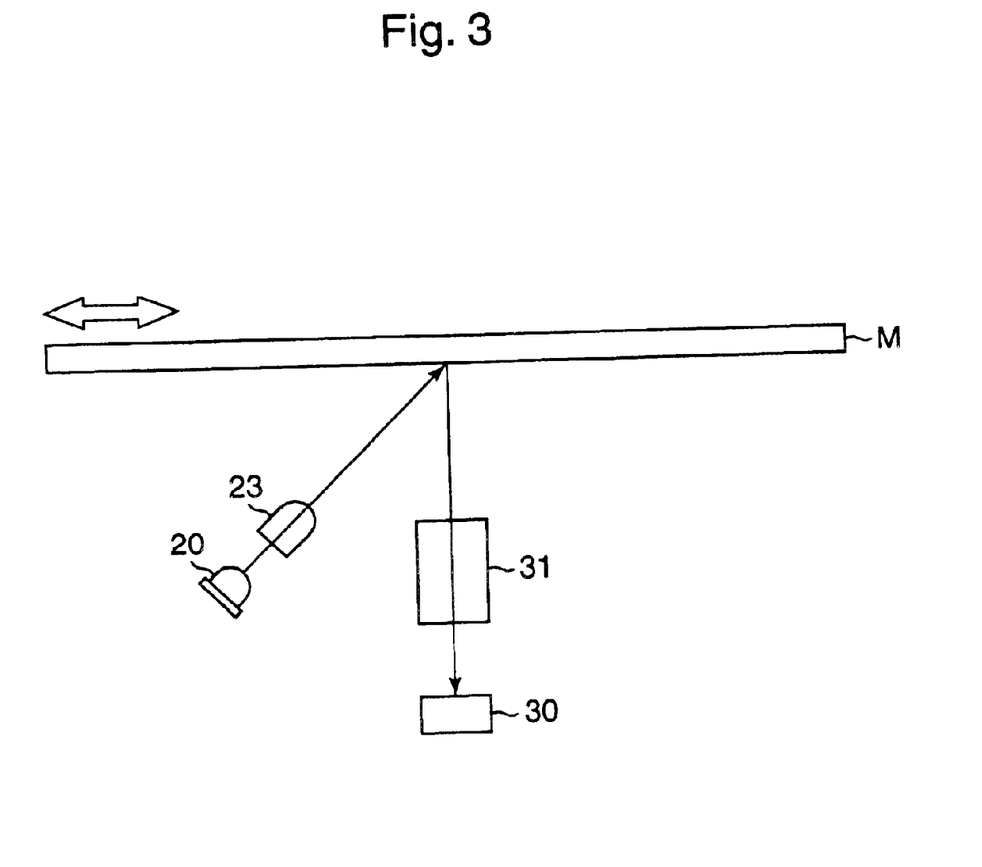
FIG. 3 is a view showing a structure, including a light source and a line sensor, used for reading an image recorded on a read object from which a light beam is reflected.

FIG. 3 shows an alternative structure, that includes the light source 20 and the line sensor 30, used for reading an image recorded on a read object M, i.e. a recording material sheet, from which a light beam is reflected. In this structure, the light source 20, the cylindrical lens 23, the line sensor 30 and the forming lens 31 are disposed under the read object M. Namely, a light beam outputted from the light source 20 is radiated on the lower surface of the read object M, so that the light beam reflected by the read object M enters the line sensor 30 through the forming lens 31.

Figure 4:
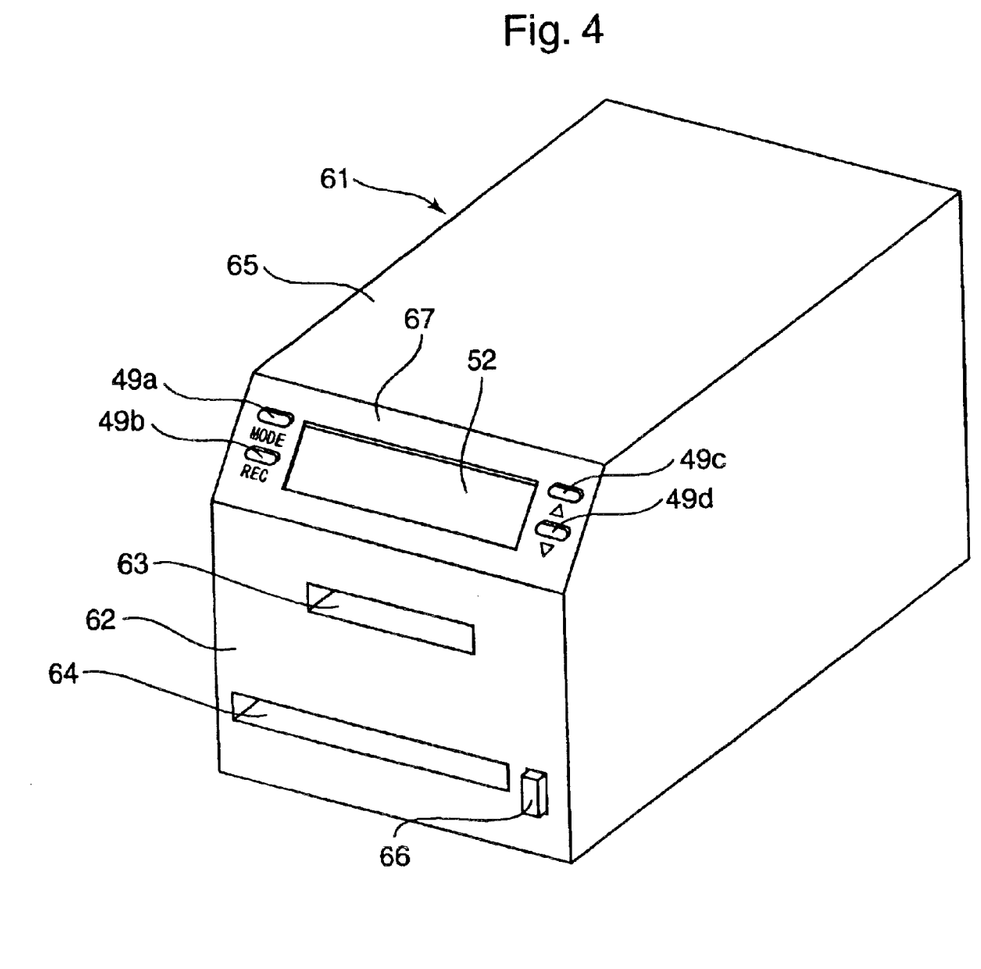
FIG. 4 is a perspective front-side view of the image reading device.

FIG. 4 is a perspective front-side view of the image reading device. A front surface 62 of a housing 61 is provided with a film inlet mouth 63, through which the film M (FIG. 1) is mounted on the stage 12 (FIG. 2), and a recording medium inlet mouth 64, through which the recording medium R is inserted in the housing 61. The film inlet mouth 63 and the recording medium inlet mouth 64 are parallel to an upper surface 65 of the housing 61. An eject button 66 is provided beside the recording medium inlet mouth 64, to remove the recording medium R from the housing 61 by depressing the eject button 66.

On a slant surface 67 formed between the upper surface 65 and the front surface 62, the display panel $S_2$ (FIG. 1) is disposed. A mode change switch 49a, a record switch 49b, an up-switch 49c and a down-switch 49d are provided on opposite sides of the display panel 52. These switches 49a, 49b, 49c and 49d correspond to the switch 49 shown in FIG. 1. Note that an operation of each of the switches 49a, 49b, 49c and 49d will be described hereinafter with reference to flowcharts shown in FIGS. 6A, 6B, 8A and 8B.

Figure 5:
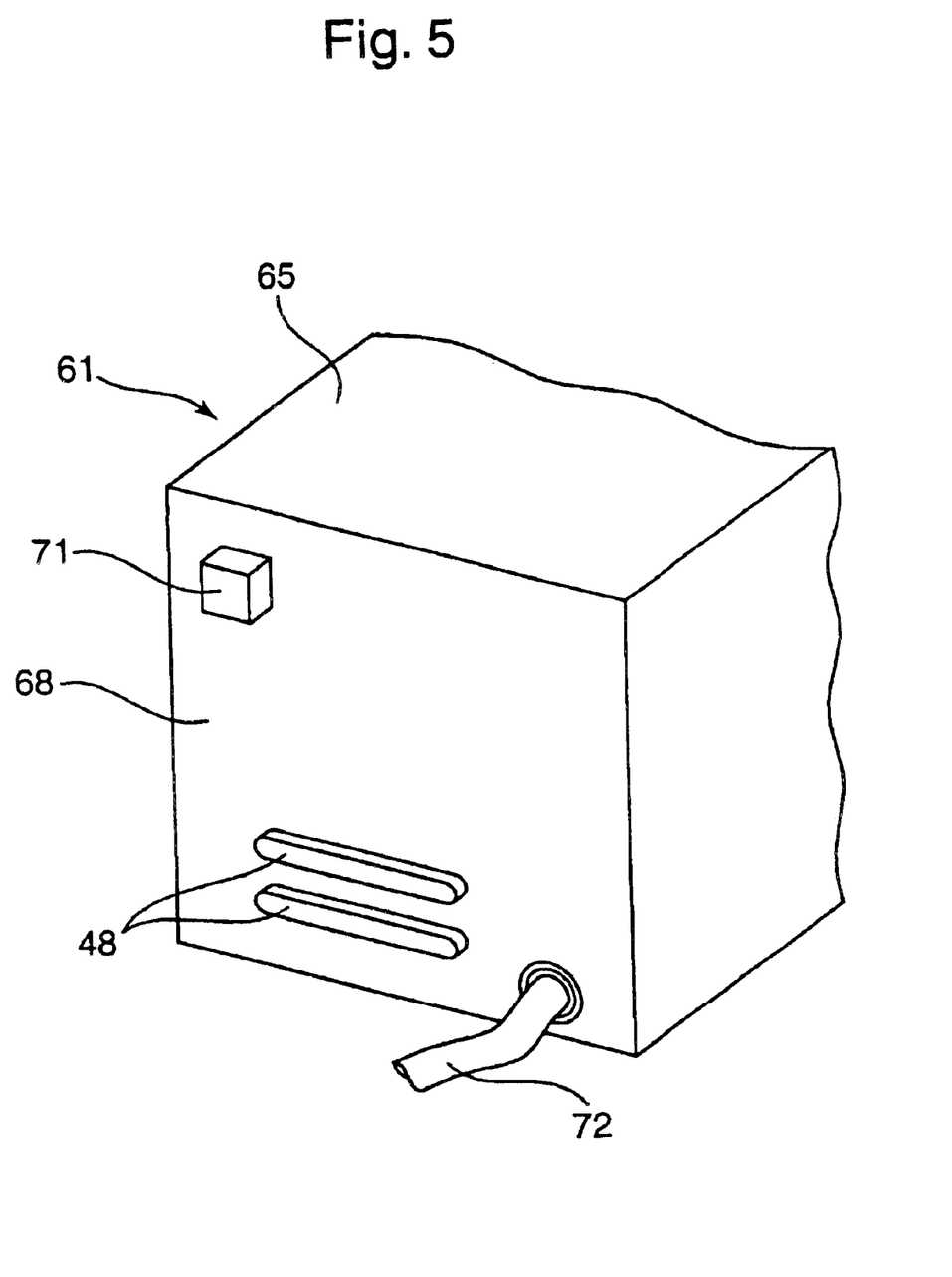
FIG. 5 is a perspective rear-side view of the image reading device.

FIG. 5 is a perspective rear-side view of the image reading device. An electric power switch 71 is disposed on an upper portion of a rear surface 68 of the housing 61, and an electric power cable 72 is provided on a lower portion of the rear surface 68. An input/output terminal 48 (FIG. 1) is provided close to the electric power cable 72.

Any recording medium R, in which image data can be recorded, can be utilized. For example, either an ATA (AT Attachment) flush memory card, being a memory card (referred to as a PC card, hereinafter) which conforms to the PCMCIA standard, a magneto-optical disc or a magnetic disk, such as a floppy disk, can be utilized.

Figure 6A:
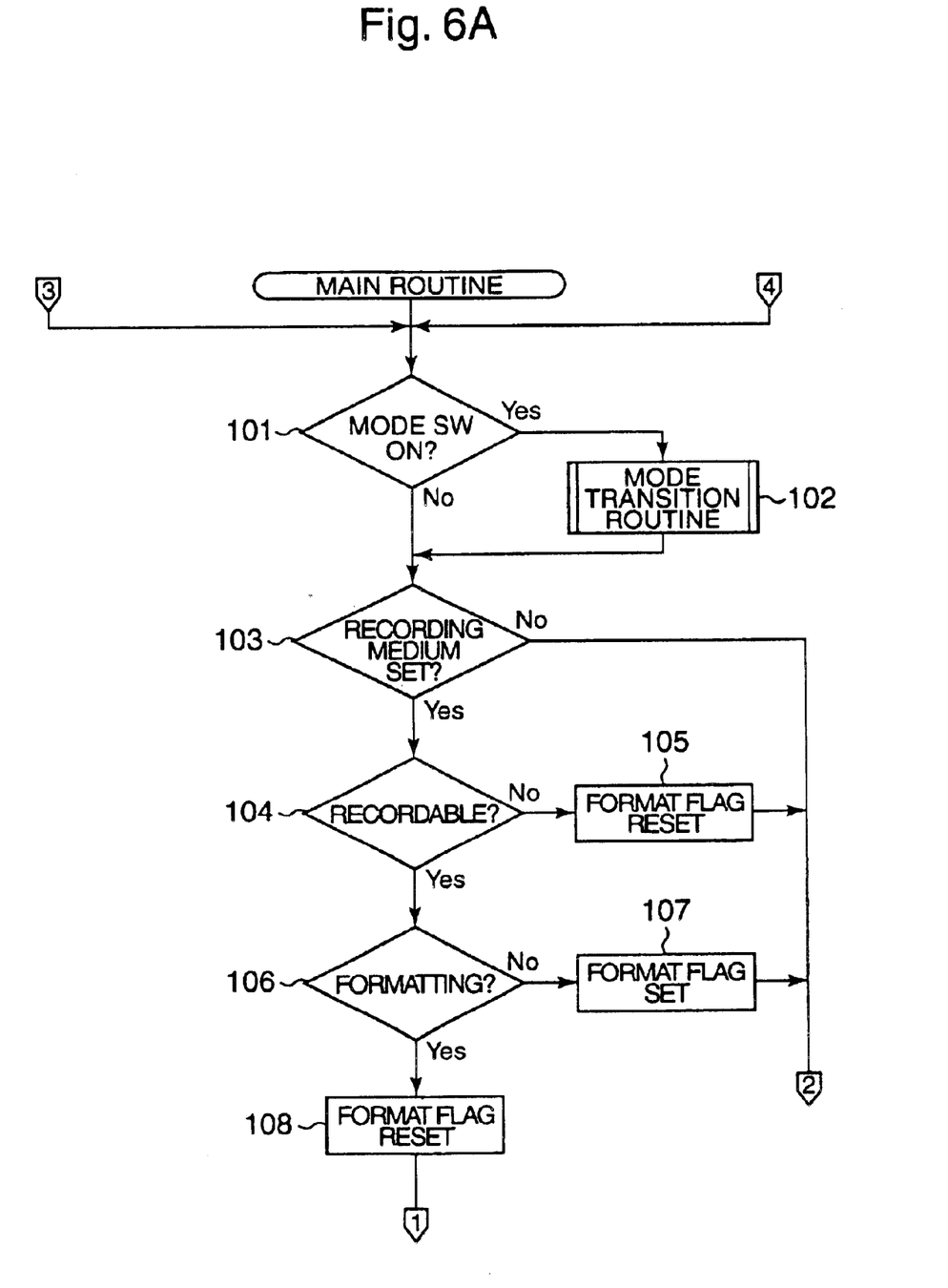
FIG. 6A is an initial part of a flowchart of a main routine by which an operation of the image reading device is controlled.
Figure 6B:
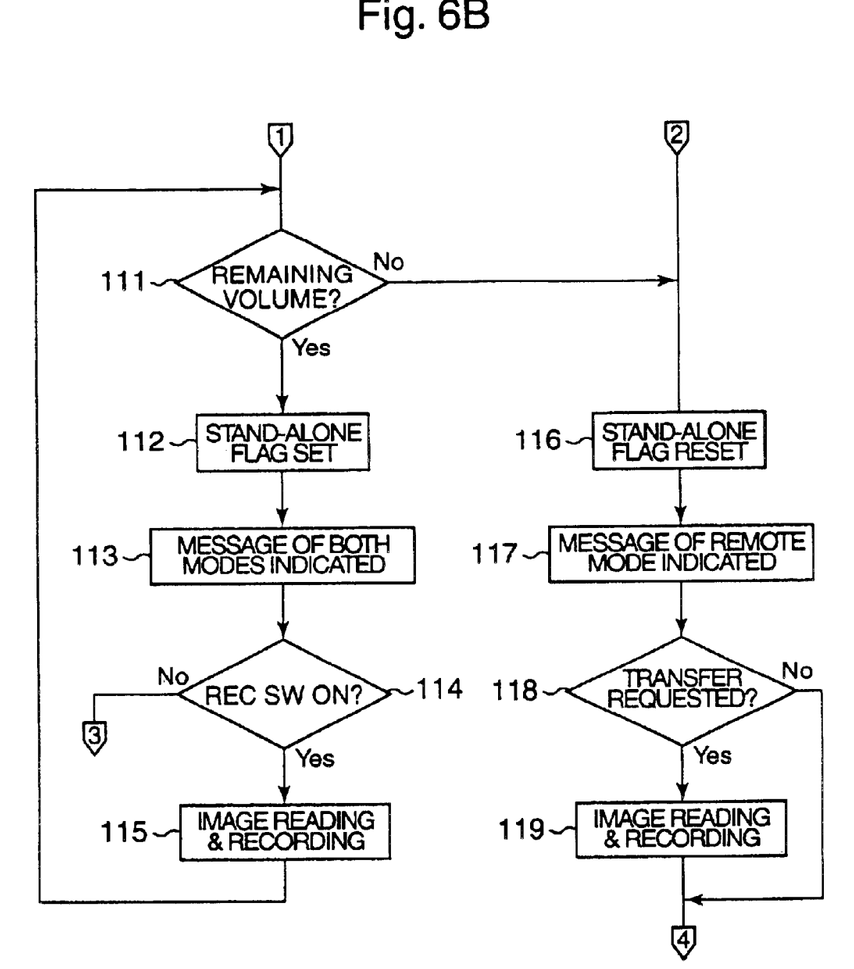
FIG. 6B is a latter part of the flowchart shown in FIG. 6A.

FIGS. 6A and 6B show a flowchart of a main routine by which an operation of the image reading device is controlled.

Figure 8A:
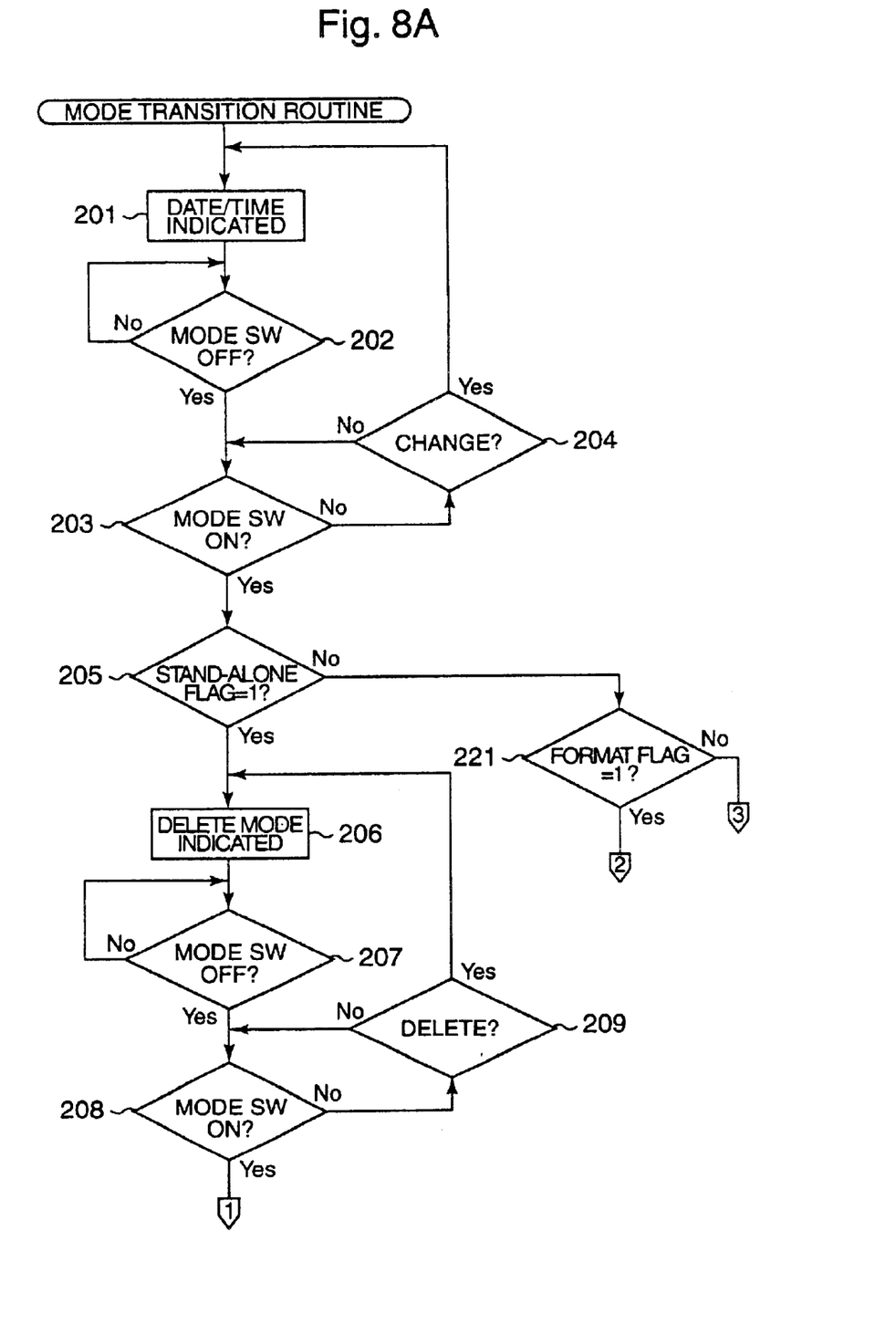
FIG. 8A is an initial part of a flowchart of a mode transition routine executed in Step 102 shown in FIG. 6A.
Figure 8B:
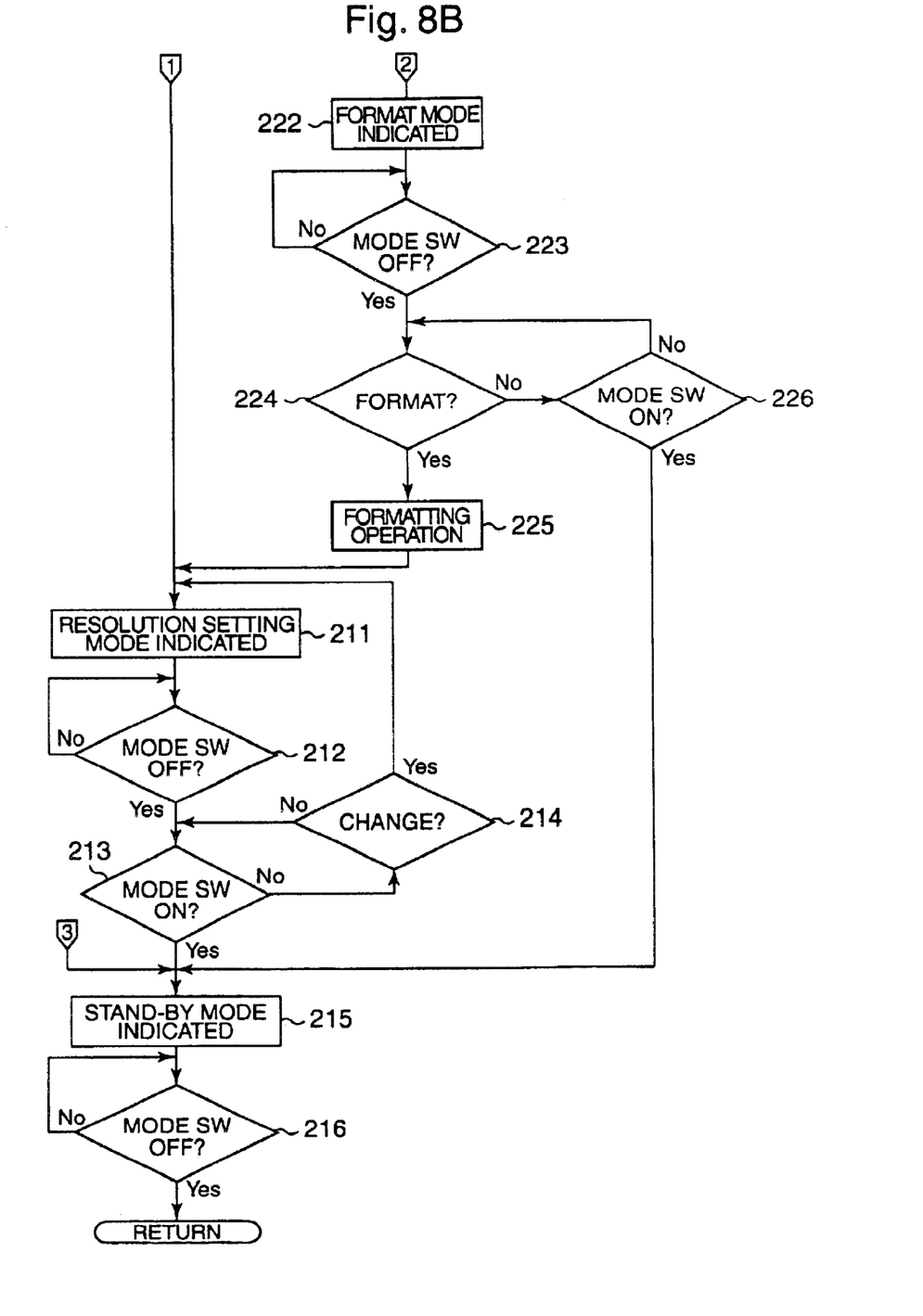
FIG. 8B is a latter part of the flowchart of the mode transition routine.

In Step 101, it is determined whether the mode change switch 49a (FIG. 4) is depressed, thus setting an ON state. When the mode change switch 49a is depressed, Step 102 is executed in which a mode transition routine shown in FIGS. 8A and 8B is executed. The mode transition routine is provided for performing various operation modes of the image reading device. For example, a formatting operation of the recording medium R is carried out in the mode transition routine.

When it is determined in Step 101 that the mode change switch 49a is not depressed, or after Step 102 is executed, Step 103 is executed, in which it is determined whether the recording medium R is set in the recording medium inlet mouth 64 (FIG. 4). When the recording medium R is not set, the process goes to Step 116, and when the recording medium R is set, the process goes to Step 104.

In Step 104, it is determined whether the recording medium R set in the inlet mouth 64 can be utilized, i.e. whether image data can be recorded in the recording medium R by the image reading device. For example, when the image reading device is constructed in such a manner that image data can be recorded only in an ATA flush memory card, being a PC card, it is determined in Step 104 that the recording medium R cannot be utilized, if a PC card other than the ATA flush memory card is set in the inlet mouth 64.

When the recording medium R cannot be utilized, Step 105 is executed in which a format flag is reset to 0, and the process goes to Step 116. Conversely, when the recording medium R can be utilized, Step 106 is executed in which it is determined whether the recording medium R has been formatted. When the recording medium R has not been formatted, Step 107 is executed in which the format flag is set to 1, and then the process goes to Step 116. Conversely, when the recording medium R has been formatted, Step 108 is executed in which the format flag is reset to 0, and the process goes to Step 111.

In Step 111, it is determined whether the recordable or remaining volume of the recording medium R is large enough to record the image data. When the remaining volume of the recording medium R is sufficient, Step 112 and the following Steps are executed, and when the remaining volume of the recording medium R is insufficient, Step 116 and the following Steps are executed.

In Step 112, a stand-alone flag is set to 1, and in Step 113, a message, implying that the operations of both the stand-alone mode and the remote mode can be performed, is indicated on the display panel 52 (FIGS. 1 and 4). An example of the message is shown by reference E1 in FIG. 7A.

Then, in Step 114, it is determined whether the record switch 49b (FIG. 4) is depressed. When the record switch 49b is not depressed, the process returns to Step 101, and thus the operations described above are performed again. Conversely, when the record switch 49b is depressed, Step 115 is executed, in which an image is read by the line sensor 30, and the image data is recorded in the recording medium R.

Thus, when the type of the recording medium R is that in which an image can be recorded by the image reading device, the recording medium R has been formatted and the remaining volume of the recording medium R is sufficient, a reading operation and a recording operation are carried out by depressing the record switch 49b.

When the reading operation and the recording operation in Step 115 are completed, the process returns to Step 111, in which the remaining volume, which exists after the recording operation of the image data, is checked. And, when the remaining volume is not sufficient, the process goes to Stop 116.

Thus, as understood from the above description, Step 116 is executed when the recording medium R is unsuitable for recording an image, or when the recording medium R is not set in a state in which an image can be recorded. In Step 116, the stand-alone flag is reset to 0, so that the recording operation is prohibited and a transfer operation of image data to the computer 50 (FIG. 1) becomes permissible, as will be described later with reference to FIGS. 8A and 8B. In Step 117, a message, implying that only the operations of the remote mode can be performed, is indicated by the display panel 52. In other words, the message indicates that a recording operation in the stand-alone mode is impossible, and an example of the message is shown by reference $E_2$ in FIG. 7B.

In Step 118, it is determined whether a transfer of image data is requested by the computer 50. When the transfer of image data is requested, Step 119 is executed in which the image is read by the line sensor 30 and the image data is transferred to the computer 50. Conversely, when the transfer of image data is not requested, Step 119 is skipped.

After executing Steps 118 and 119, the process returns to Step 101, so that the operations described above are performed again.

FIGS. 8A and 8B show a flowchart of a mode transition routine executed in Step 102 shown in FIG. 6A.

In Step 201, a date and a time are indicated by the display panel 52. When it is confirmed in Step 202 that the mode change switch 49a is released and is set to an OFF state, Step 203 is executed. Namely, the mode transition routine is started by depressing the mode change switch 49a in Step 101 of FIG. 6A, and while the mode change switch 49a remains depressed, the process does not go to Step 203.

In Step 203, it is determined whether the mode change switch 49a has again been depressed. When it is determined in Step 203 that the mode change switch 49a is not depressed, Step 204 is executed, in which it is determined whether the up-switch 49c or the down-switch 49d has been operated so that a date or a time has been changed. When the date or the time has not been changed, Steps 203 and 204 are repeatedly executed. Conversely, when the date or the time has been changed, Step 201 is executed in which the new date and/or the new time is indicated. Then, Steps 202 and 203 are again executed in this order.

During this operation, if the mode change switch 49a is depressed, the process goes from Step 203 to Step 205, in which it is determined whether the stand-alone flag is set to 1. The stand-alone flag is set to 1 when image data can be recorded in the recording medium R, as described above with reference to FIGS. 6A and 6B.

When the stand-alone flag is set to 1, an indication, implying that a delete mode is set, is shown by the display panel 52 in Step 206. Then, when it is confirmed in Step 207 that the mode change switch 49a is set to an OFF state, Step 208 is executed in which it is determined whether the mode change switch 49a is again depressed. In Step 208, when it is determined that the mode change switch 49a is not depressed, Step 209 is executed, in which an image to be deleted is selected by operating the up-switch 49c or the down-switch 49d, and it is determined whether the chosen image has been deleted by depressing the record switch 49b. Thus, in the deleting operation, the image is deleted by operating the record switch 49b.

When the deleting operation is not carried out, Steps 208 and 209 are repeatedly executed. When the deleting operation is performed, a number of the image, which has been deleted, is indicated in Step 206, and then, Steps 207 and 208 are again executed in this order.

If the mode change switch 49a is depressed while the delete mode is set, the process goes from Step 20B to Step 211, in which an indication, implying that a resolution setting mode is set, is shown by the display panel 52. When it is confirmed in Step 212 that the mode change switch 49a is set to an OFF state, Step 213 is executed in which it is determined whether the mode change switch 49a is again depressed. When it is determined in Step 213 that the mode change switch 49a is not depressed, Step 214 is executed. Namely, it is determined whether the image resolution has been changed by operating the up-switch 49c or the down-switch 49d. When the image resolution has not been changed, Steps 213 and 214 are repeatedly executed, and when the image resolution has been changed, the changed resolution is indicated in Step 211. Then, Steps 212 and 213 are again executed in this order.

Figure 7A:
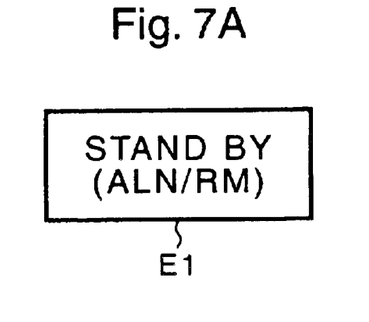
FIG. 7A is a view showing an example of a message implying that operations of a stand-alone mode can be performed.
Figure 7B:
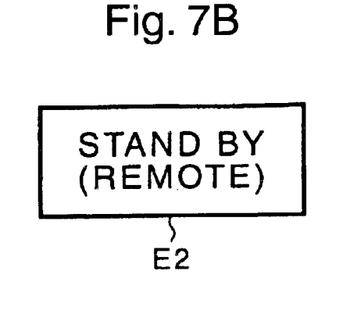
FIG. 7B is a view showing an example of a message implying that operations os a remote mode can be performed.

When it is determined in Step 213 that the mode change switch 49a is depressed, Step 215 is executed in which an indication, implying that a stand-by mode, which includes the remote mode and the stand-alone mode, is set, i.e. an indication, implying that a reading operation of an image can be performed, is shown by the display panel 52 (FIGS. 7A and 7B). Note that, when the stand-alone flag is set to 1, the image frame shown by reference E1 is indicated, and when the stand-alone flag is not set to 1, the image frame shown by reference $E_2$ is indicated. Then, when it is confirmed in Step 216 that the mode change switch 49a is set to an OFF state, i.e. has been released, this routine ends.

On the other hand, when it is determined in Step 205 that the stand-alone flag is not set to 1, Step 221 is executed in which it is determined whether a format flag is set to 1. The format flag is set to 1 only when the recording medium R is recordable and has not been formatted, as described above with reference to FIGS. 6A and 6B.

When the format flag is set to 1, an indication, implying that a format mode has been set, is shown by the display panel 52 in Step 222. When it is confirmed in step 223 that the mode change switch 49a is now set to an OFF state, Step 224 is executed in which it is determined whether the record switch 49b is depressed. When it is determined in Step 224 that the record switch 49b is depressed, the formatting operation is performed in Step 225. Namely, in the formatting operation, the recording medium R is formatted by operating the record switch 49b, and the process then goes to Step 211.

Conversely, when it is determined in Step 224 that the record switch 49b is not depressed, the process goes to Step 226, in which it is determined whether the mode change switch 49a is again depressed. While the mode change switch 49a is not depressed, Steps 224 and 226 are repeatedly executed. During the execution of Steps 224 and 226, if the mode change switch 49a is depressed, the process goes to Step 215, in which the indication of the stand-by mode is displayed. Also, when it is determined in Step 221 that the format flag is not set to 1, the process goes to Step 215.

As described above, in the embodiment, when the recording medium R is mounted in the image reading device to record image data in the recording medium R, if the recording medium R is unsuitable for recording the image data, the unsuitableness can be recognized by the operator before the record switch 49b is operated. For example, when the recording medium R cannot be utilized, Steps 101, 103, 104, 105 and 116 of FIGS. 6A and 6B are executed in this order, and then, in Step 117, the message shown in FIG. 7B, for example, is indicated by the display panel 52. Therefore, according to the embodiment, a mishandling of the record switch 49b is prevented.

Further, in the embodiment, when the recording medium R does not have a sufficient remaining volume to record new image data in the stand-alone mode, the image data is transferred to the computer 50. Namely, Steps 101, 103, 104, 106, 108, 111, 116, 117, 118 and 119 are executed in this order. Therefore, so that the image resolution is maintained, i.e. the compression ratio or the thinning rate remain constant, the image data is not recorded to the recording medium R but is recorded to a hard disk provided in the computer 50.

Although the embodiments of the present invention have been described herein with reference to the accompanying drawings, obviously many modifications and changes may be made by those skilled in this art without departing from the scope of the invention.

The present disclosure relates to subject matter contained is Japanese Patent Application No. 9-345865 (filed on Dec. 1, 1997) which is expressly incorporated herein, by reference, in its entirety.

What is claimed is:

1. An image reading device comprising:
   a housing;
   a reading processor that optically reads an image recorded on a recording material sheet to generate image data;
   an image data transmitting processor that can transmit said image data externally to a peripheral device;
   an image data recording processor that can record said image data in a recording medium that is readily removable from and reattachable to said housing;
   a recording operation determination processor that determines, based on a state of said recording medium, whether a recording operation of said image data recording processor is possible; and
   a control processor that, when said recording operation determination processor determines that said recording operation is impossible, prohibits said recording operation and allows said image data transmitting processor to transmit said image data to said peripheral device.

2. A device according to claim 1, further comprising a display device that indicates said recording operation is prohibited when said recording operation determination processor determines that said recording operation is impossible.

3. A device according to claim 1, wherein said recording operation determination processor determines whether said recording operation is possible based on a remaining recordable volume of said recording medium.

4. A device according to claim 1, wherein said recording operation determination processor determines whether said recording operation is possible based on a formatting state of said recording medium.

5. A device according to claim 1, wherein said recording operation determination processor determines whether said recording operation is possible based on a type of said recording medium.

6. A device according to claim 1, wherein said recording medium comprises a memory card.

7. A device according to claim 6, wherein said memory card comprises a PC card.

8. A device according to claim 1, wherein said recording medium comprises a magneto-optical disc.

9. A device according to claim 1, wherein said recording medium comprises a magnetic disk.

10. A device according to claim 1, wherein said peripheral device comprises a computer.

11. An image reading device comprising:

a housing;

a reading processor configured to optically read an image recorded on a recording sheet to generate image data representing the image;

an image data transmitting processor configured to externally transmit the image data to a peripheral device;

an image data recording processor configured to record the image data in a recording medium that is readily removable from and reattachable to said housing;

a recording operation determination processor configured to determine, based on a condition of the recording medium, whether a recording operation of said image data recording processor is possible; and a control processor configured to prohibit the recording operation and allow said image data recording processor to transmit the image data to the peripheral device, when said recording operation processor determines that the recording operation is impossible.

* * * * *